Nov. 17, 1925.

P. W. PRUTZMAN 1,561,999

METHOD OF TREATING OILS

Filed Sept. 2, 1922

Inventor.
Paul W. Prutzman
By Acker & Felten
his attorneys.

Patented Nov. 17, 1925.

1,561,999

UNITED STATES PATENT OFFICE.

PAUL W. PRUTZMAN, OF LOS ANGELES, CALIFORNIA, ASSIGNOR TO GENERAL PETROLEUM CORPORATION, OF LOS ANGELES, CALIFORNIA, A CORPORATION OF CALIFORNIA.

METHOD OF TREATING OILS.

Application filed September 2, 1922. Serial No. 586,030.

*To all whom it may concern:*

Be it known that I, PAUL W. PRUTZMAN, a citizen of the United States, residing at Los Angeles, in the county of Los Angeles and State of California, have invented certain new and useful Improvements in Methods of Treating Oils, of which the following is a specification.

The present invention relates to a method for purifying and decolorizing petroleum oils and petroleum products of high boiling point, at a lower cost and with greater facility than has heretofore been possible under the present methods for the treatment thereof.

In the carrying out of my method invention the following steps are resorted to, viz:—the oil to be treated is heated to a temperature in excess of 350° F. and preferably close to the boiling point of the oil, in a closed vessel from which air is removed and excluded in so far as possible; to the oil is added in sufficient quantity an adsorbent such as finely ground fuller's earth, bone-black, or the residue from the acid treatment of montmorillonite as hereinafter described, or other suitable decolorizing and purifying agent in such a manner as to prevent the admission of oxygen or air to the heated oil; allowing the decolorizing agent to react under such conditions as to minimize undesirable secondary reactions, and finally agitating the cooling mass with steam or other non-reactive gas or vapor until all volatile secondary products are eliminated. The first two steps of the method may be carried out at the same time or even reverse in order without seriously affecting the final results, although I prefer to apply them seriatum and in the order given, both as a matter of convenience and because better results may be obtained.

The materials which may be profitably purified and partly decolorized by the present method invention include all petroleum products boiling above 350° F. which in commercial terms include heavy burning oils, lubricating oils, paraffin oils, medicinal oils, solid paraffin wax, petrolatum and cylinder oils. However, some of the animal and vegetable fats and waxes may be advantageously treated under this method, but it is not suited to the purification of edible oils and similar products where the taste or flavor of the finished product is a consideration.

In carrying out my invention recourse is had to a group or class of artificial products prepared by acid treatment of certain clay-like minerals, which products when properly prepared have the property of adsorbing and removing very large proportions of impurities and coloring matters from oils at moderate temperatures, and of removing increasingly larger proportions at increasingly elevated temperatures.

When the mineral montmorillonite, locally known as otaylite and found in San Diego County, California; or the mineral known as Death Valley clay, and found in certain parts of California and Nevada; or the well known mineral bauxite; is treated with a considerable proportion, up to half its original weight, of sulfuric acid, and the acid allowed to completely react with the mineral, and the remainder if any of the acid and the soluble products of the reaction washed away by washing with water, a water-insoluble residue remains. This treatment radically modifies the materials. As a matter of fact, the acid treatment is directed to the modification of the material for the purpose of producing from a raw material, which has no appreciable decolorizing value, a finished material which has a high decolorizing value. The yield of residue on this treatment is between 75 and 80% of the net clay taken when such treatment is applied to materials of the montmorillonite class, which includes montmorillonite proper and the so-called Death Valley clay. The finished material as produced under my invention has an extremely high decolorizing value, whereas in its natural state the material acted upon has little, if any, decolorizing value.

The residues so prepared from either of these and from similar minerals are readily reduced to a powder when dry or partially dry, and in such condition have the property of adsorbing many of the impurities occurring in mineral oils, and as these impurities are thus fixed in the pores of the mineral powder they may be removed from the oil by filtering or settling out the powder. This property of adsorbing impurities and coloring matters is greatly enhanced by heating the oil during the application of the mineral residue, and to such an extent that in a typical case, where the residue from the mineral montmorillonite was applied to a steam refined cylinder oil at various temperatures, the work done by unit weight at different temperatures was in the following proportion:—at 200° Fahr., 1.00 unit of work; at 300° Fahr., 3.33 units; at 400° Fahr., 4.70 units: at 500° Fahr., 10.50 units; and at 600° Fahr., 16.00 units.

The saving resulting from thus increasing the efficiency of the adsorbent is very important, as it means not merely the reduction in quantity of expensive adsorbent used, but also proportionally reduces the quantity of oil carried away and lost in removing the adsorbent from the oil, and also the cost of the physical operation of removing the adsorbent, as by filtering However, the real value of this saving in cost will not be realized unless precautions are taken to avoid or neutralize certain secondary reactions incident to the use of powdered adsorbents at high temperatures, for if such precautions are omitted the depreciation in quality of the oil may be so great as to entirely offset the saving effected, or even to entirely destroy the commercial value of the final product. These secondary reactions are:—oxidation of the oil by oxygen admitted with or during the addition of the adsorbent; and cracking or heat decomposition of the oil incited by a fixed property of this class of adsorbent materials. It is well known that oxidation takes place readily when petroleum oils are brought into contact with atmospheric air at temperatures much above 150° F., and is accelerated by higher temperatures and by the presence of powdered adsorbent materials, which appear to act as carriers. It is also strongly promoted by introducing air below the surface of the heated oil, and by finely subdividing the air bubbles, as by these means the surface of contact is increased.

Oxidation darkens the color of oils, gives them a characteristic and unpleasant odor, and produces a blue outertone or fluorescence which is disagreeable to the eye, so that this reaction is in every way undesirable, and if it goes too far will destroy the value of the oil.

In adding powdered materials to oils at high temperature in closed vessels, air may be introduced in three ways, viz:—accidentally, as free air accompanying the charge of powder; as entrained or interstitial air, filling the voids between the grains of the compacted powder; and as adsorbed air, filling the pores in the grains of which the powder is composed. The first may be avoided by proper mechanical arrangements, and the interstitial air will be separated as the powder enters the surface of the hot oil mass, so that it acts only on such surface and with a minimum effect, also its quantity is not important. But the quantity of adsorbed air is great, and as it is given off only slowly on wetting the adsorbent with oil, it is carried into the hot mass and there disengaged in microscopic bubbles which present an enormous contact surface, and therefore are highly reactive. A pound of dried montmorillonite residue having the volume, shaken down, of 0.023 cubic feet contains about 0.172 cubic foot air, or 7½ times its own volume, this air being adsorbed and literally compressed into the pores of the mineral, and capable of being disengaged when the mineral is brought into contact with some liquid which it adsorbs more strongly than air.

In order to avoid the detrimental oxidizing effect, by removing all air from the mineral before adding the latter to the oil being treated, I prefer to mix the adsorbent powder with enough of the oil to form a fluid or thickly fluid mass, by which means the adsorbent is wetted by the oil, and to allow this fluid mass to rest until the air is thoroughly disengaged and freed from the mixture, conducting this stage of the operation at the lowest temperature at which the oil is sufficiently fluid to allow the air bubbles to pass out, and always at a temperature low enough to prevent reaction between air and oil. A temperature of 100° F. is usually high enough to allow the air to escape, and at this temperature oxidation is almost inappreciable. When free from air the portion of oil containing the adsorbent is pumped into the remainder of the oil, which may be heated either before or after such addition, and as the pump does not discharge any free air into the oil vessel, it will be seen that air is entirely excluded, and oxidation may thus be entirely avoided.

Cracking of the heated oil cannot be entirely avoided, but the action may be minimized and the undesirable effects may be neutralized. When high boiling petroleum products are heated to near their boiling point they often approach the temperature at which they begin to decompose spontaneously, and when a solid adsorbent material is added to an oil so heated its critical temperature of decomposition is thereby lowered, and decomposition sets in. The class of mineral residues used as reagents in this invention are particularly active decomposing agents because of their high value as adsorbents. The extent of the decomposing reaction, however, is limited by the duration of the life of the adsorbent, that is to say, the adsorbent continues to act as a promotor or accelerator of decomposition only so long as its adsorptive power remains, and when this is lost or satisfied by the adsorption of impurities from the oil its decomposing power disappears also, and cracking will cease provided the temperature of the oil be below its critical temperature.

I have discovered that the cracking effect may be minimized by allowing the mineral residue prior to mixing with the cold oil to retain as much water as is consistent with reducing it to a powder. Because of the extreme porosity of these residues, this proportion of water is rather high, and I have found 30% by weight of water in the partly dried residue to be a suitable proportion. This water acts to reduce the cracking effect, but it does not entirely obviate cracking. It is not essential to use water for this purpose, as the treatment with steam will neutralize the bad results following from cracking.

The undesirable effects following from cracking may be entirely neutralized by suitable manipulation of the oil during and following the addition of the mineral adsorbent. Thus, if the adsorbent be added to a heated oil at rest, the decomposition products, which are usually more volatile than the oil from which they are produced, will nevertheless remain dissolved in such oil, and will impart to it an offensive odor, and render it unstable to light and air. If, however, the oil be strongly agitated during the addition of the adsorbent and at the same time subjected to the action of steam, or some other fixed gas or vapor, by which a partial pressure effect is obtained, the pressures on the vapors of the cracked volatile bodies will be so lowered that they will distil out of the mass and be carried away with the steam or gas, and thus they will be partly carried away as formed, and such as remain after the adsorbent is all added and has completed its decolorizing and purifying action and has become saturated and has ceased to act as a promoter of decomposition, may be removed by continuing the agitation and the passage of steam or gas until the odor of decomposition disappears and the oil becomes perfectly sweet. By this means the oil may be obtained with the best possible odor, and so free from decomposition products as to be perfectly stable and permanent in color.

Any suitable apparatus may be employed for the carrying out of the method invention, the one illustrated in the accompanying drawing having proven practicable for the purpose desired and wherein—

Figures 1, 2, 3:
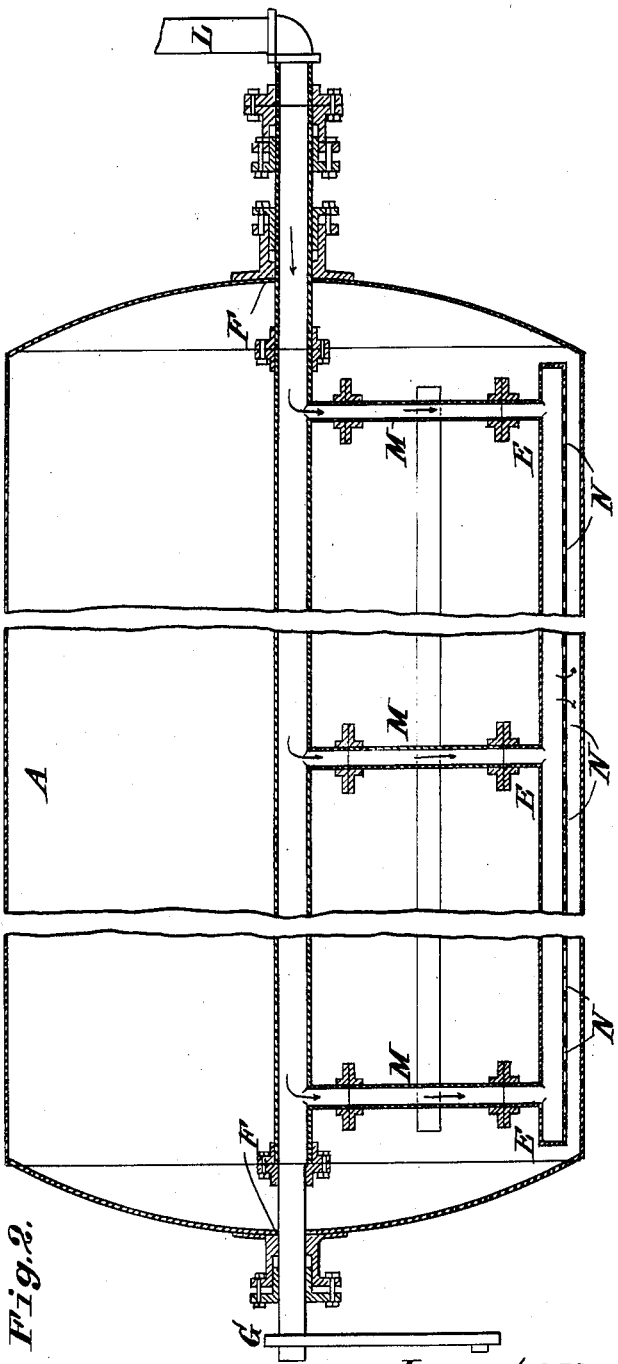
Figure 1 is an end elevation of the apparatus.
Figure 2 is a broken longitudinal sectional view of the still, taken on the line X—X Fig. 1 of the drawings.
Figure 3 is a detail view of the means for actuating the agitator for the contents of the still.

A is an ordinary cylindrical oil still, resting on walls B which form the firebox C. The oil to be treated is pumped into this still, either to be there heated, or preferably through a preheating coil in which it is brought to the desired temperature before entering the still. The still is provided with a vapor pipe D passing to a condenser not shown, or if it is not desired to condense the small amount of vapors formed, the condenser may be omitted and the still vented directly to the air.

The contents of the still are agitated by the agitator E—E, which oscillates on the trunnions F—F and is actuated by the crank G, which in turn is actuated by the cable H, and the bell-crank I, by the crank J—J and finally by the motor K, through any suitable system of belts or gearing.

Steam is admitted to the agitator through the pipe L, travels down the arms M—M, and is finally discharged through the perforations N—N. As the pipes in which these perforations are located oscillate over the entire heated surface of the still and extend from end to end, the entire bottom surface of the still is kept swept clean and the adsorbent is kept evenly distributed through the oil mass at all times. Good results have also been had without any other agitation than that produced by jetting steam against the still bottom from fixed steam pipes, and the agitating device shown is a preferred method only.

O is a tank in which the oil and adsorbent are mixed by the paddles P which are driven by the gearing Q from any suitable source of power. R is a steam coil for heating the contents of tank O if required. Many types of mixer are suitable for this purpose, the only essential requirement being that the mixture of oil and adsorbent shall be allowed to rest until the air is disengaged, which makes continuous feed mixers unsuitable unless provided with a receiving tank.

S is a pump for transferring the contents of the mixer O to the still A, through the line T. The discharge from this line may be allowed to fall onto the hot contents of still, or it may be distributed through a perforated pipe running the length of the still and located above the oil level.

In operating this apparatus the still A is filled with the oil to be treated, and brought to the proper temperature, either by heating while pumping in or by a fire in the fire-box C. In either case steam should be turned into the still at from 300 to 350° F., as is common practice in distilling oils, and the agitator, if any is used, should be started.

A sufficient portion of cold oil is at the same time pumped into mixer O, and the quantity of adsorbent required for the amount of oil contained in the still plus the amount contained in the mixer, added to the oil in the mixer, and blended therewith until the mixture is of a creamy consistency and free from lumps. If the oil is very heavy it may be heated gently, up to say 100° F., to promote mixing. The mixture is now allowed to stand quietly, or with very gentle rotation of the agitating paddles, until air ceases to come to the surface, which usually requires several hours.

The oil in the still now being hot and the steam jets in action, the pump S is started and the air-free adsorbent mixture pumped into the still. If the adsorbent used is free from water the mixture may be pumped in as fast as desired, but if it contains much water the pump speed should be so regulated that the evolution of steam taking place when the wet clay falls into the hot oil will not overload the vapor vent and throw too much back pressure onto the still. If any reasonable care is taken in this regard it will be found very easy to pump in mixtures containing considerable water without frothing or bumping of the contents of the still, but care should be taken not to cool the contents of the still too far while pumping in the absorbent mixture, as below 350° Fahr. frothing is likely to occur.

The oil-adsorbent mixture being all pumped in, agitation and steaming are continued until no further reduction in depth of color of oil, as determined by filtering and comparing small samples drawn from the still, can be observed, and also until such samples have no cracked or offensive odor. Usually the maximum color effect will be attained in about half an hour, and freedom from odor in an hour or less, after the last of the adsorbent mixture is pumped in, though these times will be controlled to some extent by the sizes of the batch and by the proportion of adsorbent added, large batches and heavy doses of adsorbent requiring longer treatment than is here indicated.

When it is observed that the reaction is complete and the product thoroughly sweetened, the oil is withdrawn from the still through a cooling coil, in the manner commonly practiced in pumping out still bottoms, or in other convenient manner, and thereafter the suspended solid adsorbent separated from the treated oil by filter-pressing or centrifuging or other of the well known means for separating liquids from solids.

This process may be applied with particular advantage to the purification of such reduced oils as the so-called steam refined cylinder oils, as these oils while in process of reduction are already at the proper temperature for treatment. In this application of my invention the oscillating paddles E—E may be fitted into the reducing stills, or they may be dispensed with and the usual bottom steam used for agitation. The mixture of adsorbent with a portion of the non-reduced oil, or with a portion of reduced oil from a previous batch, is prepared as above described and the air allowed to separate. This mixture is then pumped into the still in which the oil is being reduced at some suitable stage in the distillation, preferably near the end of the run and before the still contents are graded. The reduction is then finished in the usual manner, the contents of the still tested for viscosity or flash test or whatever property is fixed in advance as determining the finish of the run, and after pumping out the still contents the spent adsorbent is separated from the purified oil by filtration or other convenient manner. As reducing runs are always made with steam in the still, all the requisites of this process, that is to say, the exclusion of air, the maintenance of the highest temperature on the oil, and the steaming off of any decomposition products, are provided without any addition to the ordinary process of reduction other than the preparation and addition of the air-free adsorbent mixture and the separation from the oil of the spent adsorbent.

Having thus described the invention, what is claimed as new and desired to be protected by Letters Patent is—

1. The method of purifying and partly decolorizing oil, which consists in mixing with a portion of the oil to be decolorized a powdered porous adsorbent material, allowing the mixture to rest until the air has been displaced from the pores of the adsorbent by the oil intermixed therewith, then heating the remainder of the oil to a temperature above 350° F. and intermixing therewith the above said mixture of oil and adsorbent, to permit the adsorbent to withdraw coloring matter from the oil, and finally separating the spent adsorbent with its contained coloring matter from the decolorized oil by mechanical means.

2. The method of purifying and partly decolorizing oils which consists in mixing with a portion of the oil to be decolorized a powdered porous adsorbent material, allowing the mixture to rest until the air has been displaced from the pores of the adsorbent by the oil intermixed therewith, then heating the remainder of the oil to a temperature above 350° F. and delivering onto the body of the heated oil a relatively small stream of the above said mixture for intermixing with the body of hot oil, the temperature of the oil body being maintained during the period of delivery of such mixture, and finally separating the spent adsorbent from the purified oil by mechanical means.

3. The method of purifying and partly decolorizing oils, which consists in mixing with a portion of the oil to be decolorized a powdered porous adsorbent material, allowing the mixture to rest until the air has been displaced from the pores of the adsorbent by the oil intermixed therewith, then heating the remainder of the oil to a temperature above 350° F., and delivering into the body of hot oil a relatively small stream of the above said mixture, vigorously agitating the body of hot oil and maintaining its temperature during the period of such delivery to permit the adsorbent to withdraw coloring matter from the hot oil, and finally separating the spent adsorbent with its contained coloring matter from the decolorized oil by mechanical means.

4. The method of purifying and partly decolorizing oils which consists in mixing with a portion of the oil to be decolorized a powdered porous adsorbent material, allowing the mixture to rest until the air has been displaced from the pores of the adsorbent by the oil intermixed therewith, then mixing the above said oil adsorbent mixture with the remainder of the oil to be decolorized, heating this mixture to a temperature above 350° F., and finally separating the spent adsorbent from the decolorized oil by mechanical means.

In testimony whereof I have signed my name to this specification.

PAUL W. PRUTZMAN.